United States Patent
Lowney (10) Patent No.: US 6,534,745 B1
(45) Date of Patent: Mar. 18, 2003

(54) NOZZLE PARTICULARLY SUITED TO DIRECT METAL DEPOSITION

(76) Inventor: Mathew T. J. Lowney, 24460 Millstream, Novi, MI (US) 48375

(*) Notice: Subject to any disclaimer, the term of this patent is extended or adjusted under 35 U.S.C. 154(b) by 0 days.

(21) Appl. No.: 09/671,535

(22) Filed: Sep. 27, 2000

Related U.S. Application Data
(60) Provisional application No. 60/156,203, filed on Sep. 27, 1999.

(51) Int. Cl.⁷ .......................... B23K 26/14; B23K 26/34
(52) U.S. Cl. ............................ 219/121.84; 219/121.63
(58) Field of Search .................... 219/121, 84, 121.63; 427/554, 555, 556, 596

(56) References Cited

U.S. PATENT DOCUMENTS

| | | | |
|---|---|---|---|
| 4,724,299 A | | 2/1988 | Hammeke .............. 219/121.84 |
| 4,803,335 A | | 2/1989 | Steen et al. ............ 219/121.84 |
| 4,804,815 A | | 2/1989 | Everett .................... 219/121.6 |
| 5,321,228 A | * | 6/1994 | Krause et al. ......... 219/121.84 |
| 5,418,350 A | * | 5/1995 | Freneaux et al. ...... 219/121.84 |
| 5,453,329 A | | 9/1995 | Everett et al. .............. 428/565 |
| 5,477,025 A | | 12/1995 | Everett et al. ......... 219/121.84 |
| 5,477,026 A | * | 12/1995 | Buongiorno ........... 219/121.84 |
| 5,837,960 A | * | 11/1998 | Lewis et al. ........... 219/121.63 |
| 6,042,019 A | * | 3/2000 | Rusch | |
| 6,046,426 A | * | 4/2000 | Jeantette et al. ....... 219/121.63 |
| 6,122,564 A | | 9/2000 | Koch et al. ................. 700/123 |
| 6,268,584 B1 | * | 7/2001 | Keicher et al. ........ 219/121.84 |

* cited by examiner

Primary Examiner—Geoffrey S. Evans
(74) Attorney, Agent, or Firm—Gifford, Krass, Groh, Sprinkle, Anderson & Citkowski, PC (57) ABSTRACT

A nozzle particularly suited to direct metal deposition increases the quality of metallurgical properties, enhances deposition rate and process efficiency, and improves surface quality, reliability, and maintainability. The preferred embodiment includes a body having a central axis and a distal end terminating in a distal tip through which a laser beam emerges. A gas-carried powder feed path terminates in one or more powder outlets arranged in a first concentric ring surrounding the laser beam, and a shaping-gas inlet and one or more shaping-gas outlets are arranged in a second concentric ring surrounding the laser beam. The internal geometry of the body is such that the laser beam, powder, and shaping gas all converge substantially within a localized region of a workpiece spaced apart from the distal tip at a working distance. The assembly preferably further includes a powder splitter that evenly distributes powder flow into a plurality of tubes within the body, and an inner tip surrounding the laser beam, the distal tip including conical end against which the powder is urged prior to exiting the body to assist in directing the powder to the localized point of the workpiece. The shaping gas preferably exits the body in a laminar flow condition. At least a portion of the distal tip is adjustable to alter the working distance to the workpiece.

19 Claims, 8 Drawing Sheets

DMD Nozzle - 11.6 mm Stand-off

FIGURE 4A

DMD Nozzle - 28.0 mm Stand-off

NOZZLE PARTICULARLY SUITED TO DIRECT METAL DEPOSITION

REFERENCE TO RELATED APPLICATION

This application claims priority from U.S. provisional patent application Ser. No. 60/156,203, filed Sep. 27, 1999, the entire contents of which are incorporated herein by reference.

FIELD OF THE INVENTION

This invention relates generally to additive manufacturing and, in particular, to nozzle configurations, and methods of use, in conjunction with laser-based direct metal deposition.

BACKGROUND OF THE INVENTION

As disclosed in commonly assigned U.S. Pat. No. 6,122,564, the entire contents of which are disclosed herein by reference, direct metal deposition (DMD™) is a laser-based fabrication process capable of producing near net-shape, fully dense molds, dies, and precision parts, as well as engineering changes or repairs to existing tooling or parts. According to the process, an industrial laser beam is focused onto a workpiece, creating a melt pool into which powdered metal is injected. The beam is moved under CNC control, based on a CAD geometry, tracing out the part, preferably on a layer-by-layer basis. Optical feedback is preferably used to maintain tight control over the process.

An integral part of the DMD™ process is the deposition nozzle used to deliver the metal powders to the melt pool. The nozzle must provide consistent and accurate control of the metal powder, which has a direct impact on the metallurgical properties, surface finish, and efficiency of the process. Existing nozzles for metal powder deposition or laser cladding have very low efficiencies, or catchment of powder being deposited. This results in excess powder on the workpiece, more frequent additions of powder in the storage devices, and higher costs. The efficiencies of laser based powder metallurgy nozzles are typically 15% efficient, meaning of the total volume of powder delivered to the melt pool only 15% of that powder is deposited.

A laser spray nozzle assembly is described in U.S. Pat. No. 4,724,299. The assembly includes a nozzle body with first and second spaced apart end portions. A housing, spaced from the second end portion, forms an annular passage. A cladding powder supply system is operably associated with the passage for supplying cladding powder thereto so that the powder exits the opening coaxial with a laser beam.

In operation, this nozzle has been found to exhibit a very low deposition efficiency. Other drawbacks include insufficient cooling through the nozzle (primarily the inner tip), powder supply and feed tubes which tend to be too restrictive and exposed to reflected laser beams, frequent clogging as the powder exits the nozzle towards the workpiece, no means of automated clog detection, and poor surface quality. Thus, the need remains for a nozzle exhibiting higher deposition efficiencies while solving some or all of these stated problems.

SUMMARY OF THE INVENTION

This invention resides in a nozzle, particularly suited to direct metal deposition, In operation, the improved nozzle increases the quality of metallurgical properties, enhances deposition rate and process efficiency, and improves surface quality, reliability, and maintainability. The inventive nozzle also permits multiple configurations, thereby creating a range of clearances from the workpiece. This allows flexibility for repair processes that require clearances to access deep cavities in a work piece.

In terms of construction, a nozzle assembly according to the invention includes a body having a central axis and a distal end terminating in a distal tip through which a laser beam emerges. A gas-carried powder feed path terminates in one or more powder outlets arranged in a first concentric ring surrounding the laser beam, and a shaping-gas inlet and one or more shaping-gas outlets are arranged in a second concentric ring surrounding the laser beam. The internal geometry of the body is such that the laser beam, powder, and shaping gas all converge substantially within a localized region of a workpiece spaced apart from the distal tip at a working distance.

In the preferred embodiment, the assembly further includes a powder splitter that evenly distributes powder flow into a plurality of tubes within the body, and an inner tip surrounding the laser beam, the distal tip including conical end against which the powder is urged prior to exiting the body to assist in directing the powder to the localized point of the workpiece. The shaping gas preferably exits the body in a laminar flow condition.

In the preferred embodiment as well, at least a portion of the distal tip is adjustable to alter the working distance from between 10 and 30 mm, for example. The preferred nozzle also includes a coolant input and output and a cooling circuit within the body that promotes turbulent flow of the coolant for improved heat transfer, and one or more contact thermocouples in communication with a controller for terminating the operation of the nozzle and/or generating an alarm if a desired operating condition is not met. The body is preferably constructed out of a highly thermally conductive material such as copper, or an alloy thereof, and surfaces of the body exposed to powder flow are electroplated with hard chromium.

DETAILED DESCRIPTION OF THE INVENTION

Figure 1:
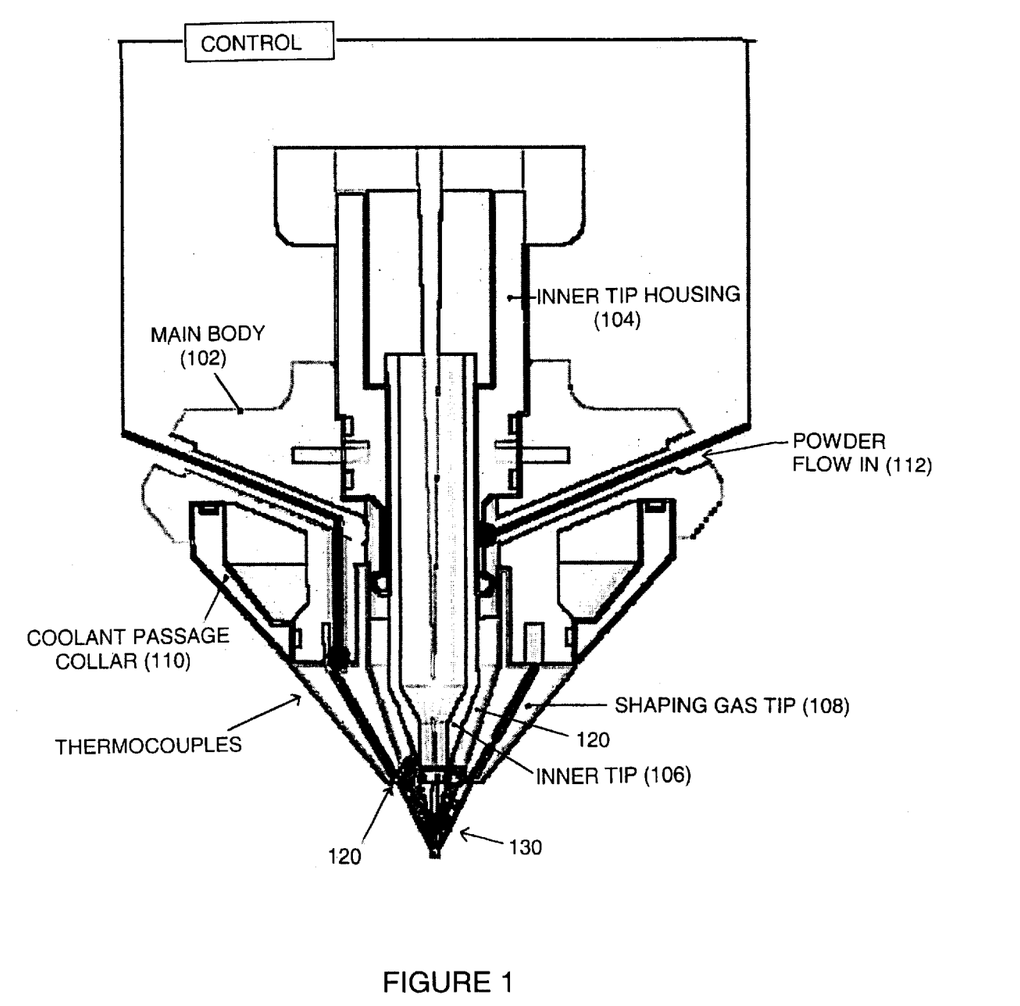
FIG. 1 is a drawing which illustrates a preferred nozzle assembly according to the invention.

A nozzle assembly according to the invention is depicted in FIG. 1. The preferred embodiment includes five major components, as follows: a main body 102, inner tip housing 104, an inner tip 106, an outer shaping gas tip 108, and a cooling passage collar 110. The body is preferably machined out of a copper alloy for optimal thermal conductivity, and the surfaces of the nozzle that are exposed to the powder flow are preferably electroplated with hard chromium to provide a wear-resistant surface against highly abrasive tool steel powders. Since the nozzle is exposed to the intense heat of the melt pool and reflected laser beams, the copper also provides a high reflectivity to minimize heat generated from reflected laser beams being emitted from the weld pool and off of the workpiece.

The cooling circuit associated with the inventive nozzle is designed to optimize heat transfer from the inner and shaping gas tips, which are exposed to the highest temperatures during the deposition process. The heat is transferred into the nozzle coolant, typically a water/glycol mixture. Maximum cooling of these tips are necessary in preventing clogs from occurring, and increasing productivity of the process. Clogging of previous laser cladding nozzles was due to the nozzle tips having too high of an operating temperature. The metal powder being delivered through the nozzle, which flows along the tip, would begin to sinter to the tip. Once a few particles sinter, or cling, to the wall of the tip, the powder starts to accumulate behind the powder which is sintered to the nozzle tip. The powder building up causes a disruption in powder flow, resulting in uneven non concentric flow to the weld pool. The sintered powder is also exposed to reflected laser light, which can melt the sintered powder and also begin to melt the nozzle tip. With lower melting point materials the clogging of the nozzle is more pronounced and more frequent.

Figure 2:
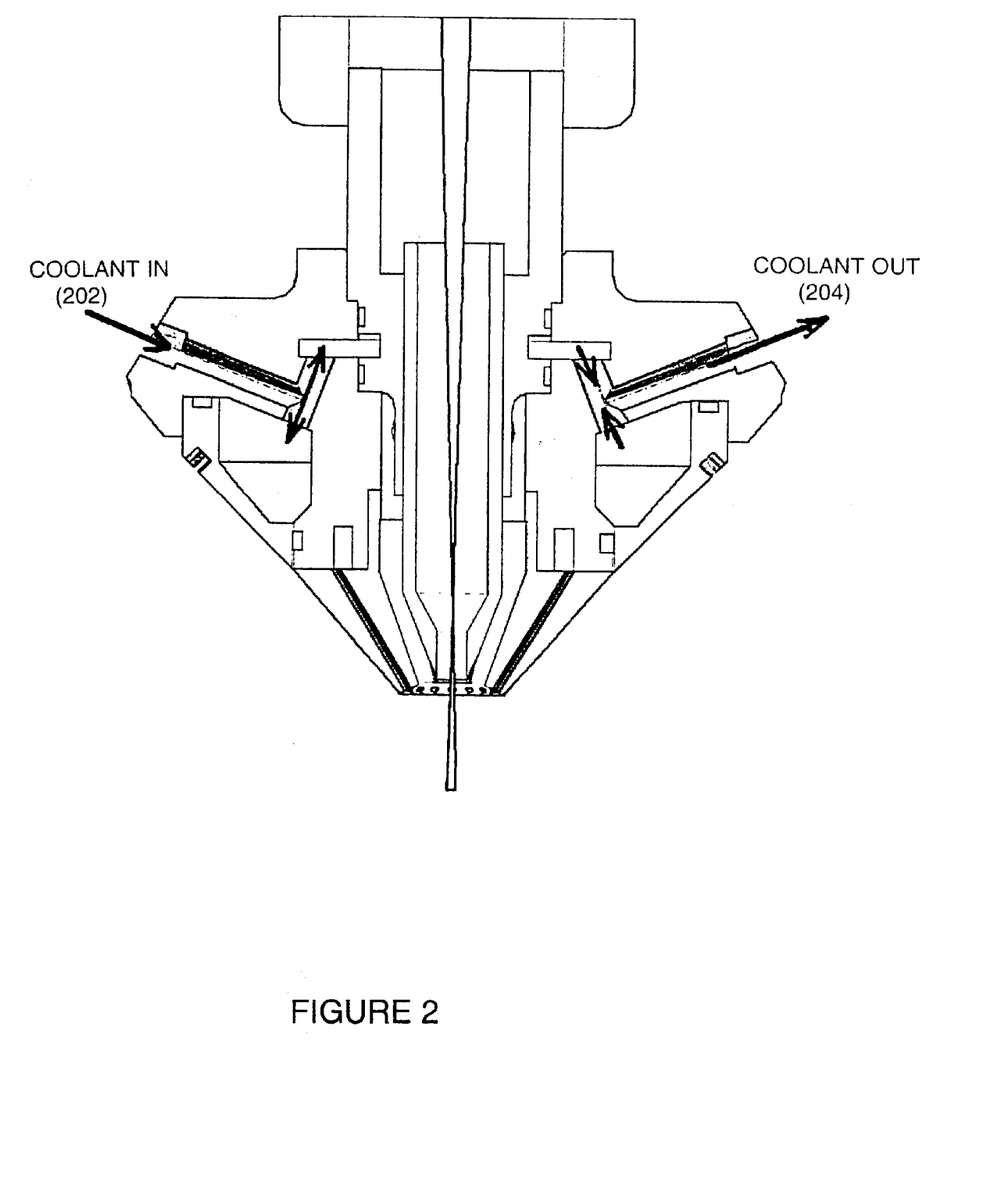
FIG. 2 shows a cooling supply line and return line and flow through internal passageways.

As best seen in FIG. 2, the nozzle includes a cooling supply line 202 and return line 204 for flow through the passageways. The supply and return are preferably located 180 degrees apart from one another at the entry and exit on the nozzle, thereby establishing a uniform flow about the center of the nozzle. Once the coolant enters the nozzle supply line, flow is diverted in two directions inside the nozzle into two passageways, or relieves, inside of the nozzle assembly. One of the passageways allows coolant to flow around the inner tip housing. The heat is transferred out of the inner tip towards the cooling passageway and into the coolant.

The coolant flows through abrupt 90 degree channels causing turbulent flow, which improves the transfer rate. The second passageway surrounds the entire nozzle. It contains a larger volume of coolant than the first passageway, because there is more material to transfer the heat through. The second passageway primarily cools the shaping gas tip and the main body of the nozzle. The secondary passageway is contained by the main body of the nozzle and a collar which is removable for maintenance. The coolant enters into the second passageway through abrupt 90 degree channels, and the surface of the nozzle main body is knurled on the cooling passageway walls, both causing turbulent flow. The shaping gas tip is threaded and torqued into the main body, and also seats on the machined face of the main body. Heat is transferred across those surfaces through the main body and into the coolant. The inventive nozzle facilitates continuous processing without any clogging problems, including the processing of low melting point materials such as Tin or Aluminum.

High laser power density is often required when processing refractory materials such as pure tungsten (W). The preferred nozzle therefore also utilizes temperature monitoring of the inner tip and shaping gas tip. The temperature of each is monitored by separate thermocouples, which the signal is an input to the CNC controls used to define a normal operating temperature range.

If the temperature detected is greater than the range defined in the CNC controls, the CNC will stop the process or send and alarm/warning. An increase in temperature of the inner or shaping gas tip exceeding the normal operating temperature is either caused due to a clog, laser beam alignment problem (laser beam is clipping the inner tip of the nozzle), or coolant flow problem. In the event the temperature detected is greater than the maximum of the normal operating range, the CNC controls stop the process. This prevents any loss in material deposition quality, or possible damage to equipment.

The normal operating temperature range was determined by running several tests to find the minimum and maximum temperatures with all process parameters defined. The coolant temperature flowing through the nozzle is 70° F. [+4° F.]. The normal operating temperature range of the DMD™ Nozzle inner tip=150° F.–400° F., and the shaping gas tip=150° F.–350° F. [during the processing of tool steels]. If the temperature exceeds 400° F. or greater the process is stopped. Measured temperature of inner tip when clog occurs=600° F.+, measured temperature when laser beam clips inner tip=700° F.+.

Returning to FIG. 1, the assembly receives powder flow from a powder splitter that evenly distributes powder flow into a plurality of tubes 112 (only two of which are visible in FIG. 1). The powder is controlled at a defined feed rate, and is carried with an inert gas at a controlled flow rate. The powder tubes, preferably four in number, enter into the top of the nozzle spaced every 90 degrees. The powder continues through four lines in the nozzle, which are at a decline, relative to horizontal.

The powder exits the lines into a chamber 120. The chamber is a cylindrical cavity in the nozzle that surrounds the inner tip 106 which, in turn, surrounds the laser beam. As the powder enters the chamber, it drops down through the chamber along the walls of the inner tip. It then bounces off a radial ring along the wall of the inner tip. This forces the powder to follow the internal angle of the shaping gas tip, at the same time evenly distributing powder concentrically on the inside diameter of the shaping gas tip. The powder exits, between the inner and outer, "shaping gas," tip in a cone shape 130 that surrounding the laser beam.

Figure 3:
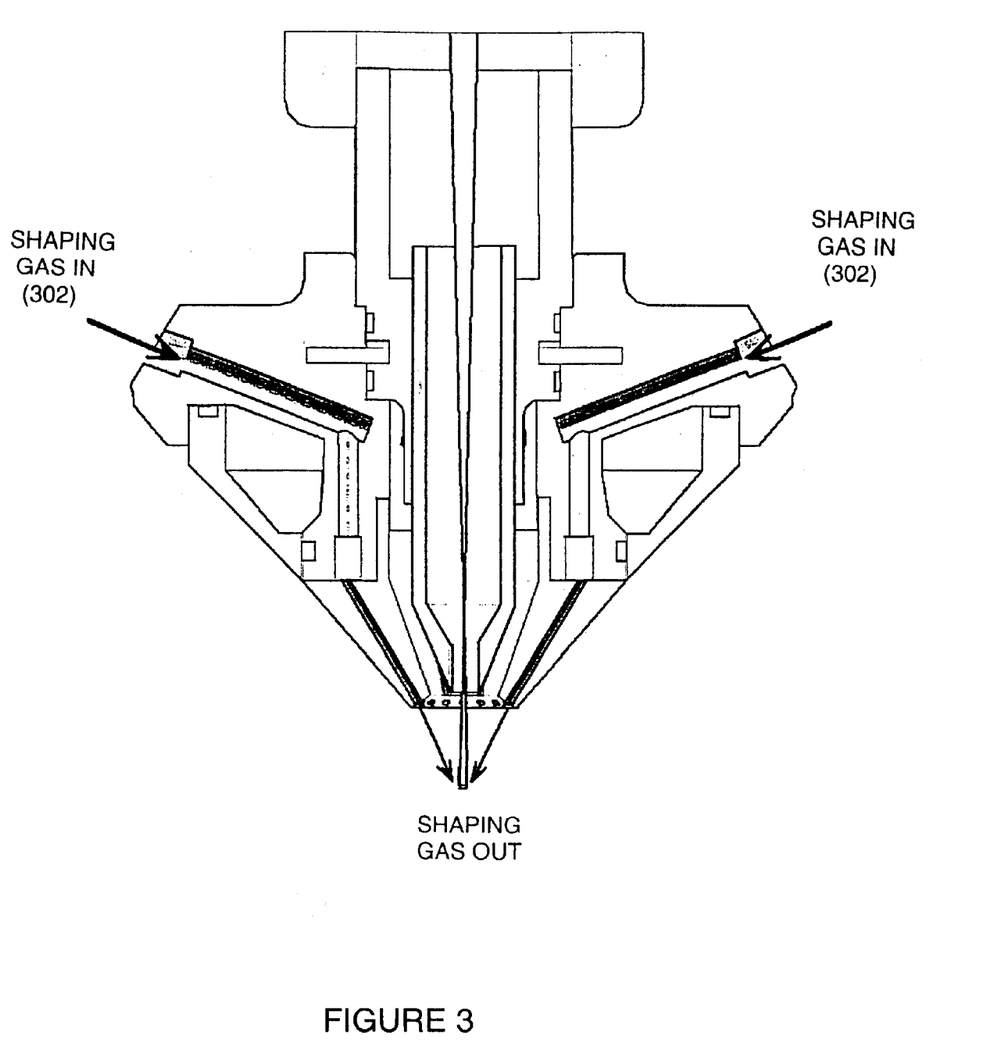
FIG. 3 illustrates a preferred shaping gas tip which is preferably comprised of a plurality of evenly spaced ports around the diameter of an outer tip.

The laser beam is focused through the center of the inner tip. The outer, or shaping, tip provides gas flow concentric to the powder flow and beam. The "shaping gas" tip, best seen in FIG. 3, is preferably comprised of a plurality of evenly spaced ports around the diameter of the outer tip. Sixteen such ports are used in the preferred embodiment. The port length, diameter, and angle are defined by a predetermined flow calculation. The gas is delivered to the nozzle by tubes 302, which supplies a gland of predetermined volume within the nozzle. This cavity is the supply for the gas ports through the shaping gas tip.

The gas exits the tip in a laminar flow condition. The gas exits the outer tip and directs the flow of powder resulting in the powder impinging to the beam diameter that is desired. Hence the name "shaping gas." This causes the powder density at the operating beam diameter to increase, due to the flow of powder becoming concentrated by the shaping gas. As a result the process, or deposition, efficiencies are increased, and a lower powder feed rate can be used.

The shaping gas used is an inert gas, typically argon and/or helium, so it also provides shielding for the melt pool. The gas flow rate is defined and monitored through a metering valve system. The shaping gas tip of the inventive nozzle is also interchangeable, which allows the stand-off away from the work piece to be changed. The inner tip is also interchangeable and adjustable can be set up to operate at a plurality of distances from the workpiece, preferably in a range of 11.6 to 28 mm. The ability to change the stand-off from the workpiece creates increased flexibility for applications which sometimes require additional clearances to perform direct metal deposition. The entire assembly is independently adjustable up and down relative to the focal point of the laser beam, so the same beam diameter can be maintained through the stand-off range.

Figure 4A:
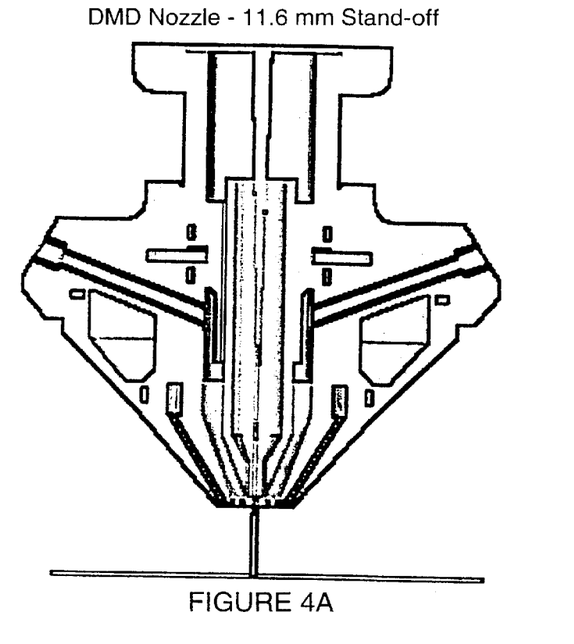
FIGS. 4A and 4B depict how the shaping gas tip is preferably interchangeable, which allows the impingement point of the powder to be defined relative to the beam diameter.
Figure 4B:
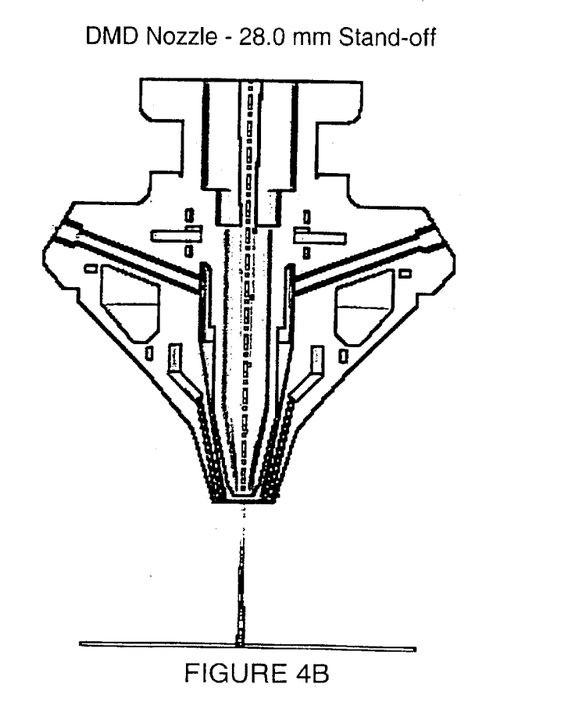

The standard nozzle set up utilizes the 11.6 mm stand-off, where minimal or no clearances are required. The 11.6 mm stand-off results in the highest powder efficiencies. The 28.0 mm stand-off is typically used in deposition repair processes which need to be performed in a cavity where additional clearances are required to avoid collisions or interferences. FIG. 4A shows the nozzle in the 11.6 mm stand-off configuration, whereas FIG. 4B shows the nozzle in the 28.0 mm stand-off configuration Use of the inventive nozzle improves the metallurgical properties of the materials being deposited. Due to the fact that the powder is shaped to specified beam diameter, the powder is more concentrated and uniformly spaced and distributed to the melt pool, which is generated by the laser. This results in very high material density, reduction in porosity. The additional inert shaping gas flow, which is directed to the melt pool, eliminates oxides in the composition of the material being deposited. The shaping gas also provides enough localized shielding of the melt pool, as deposition takes place, preventing the need for any additional inert atmosphere for the processing of tool steels.

Figure 5A:
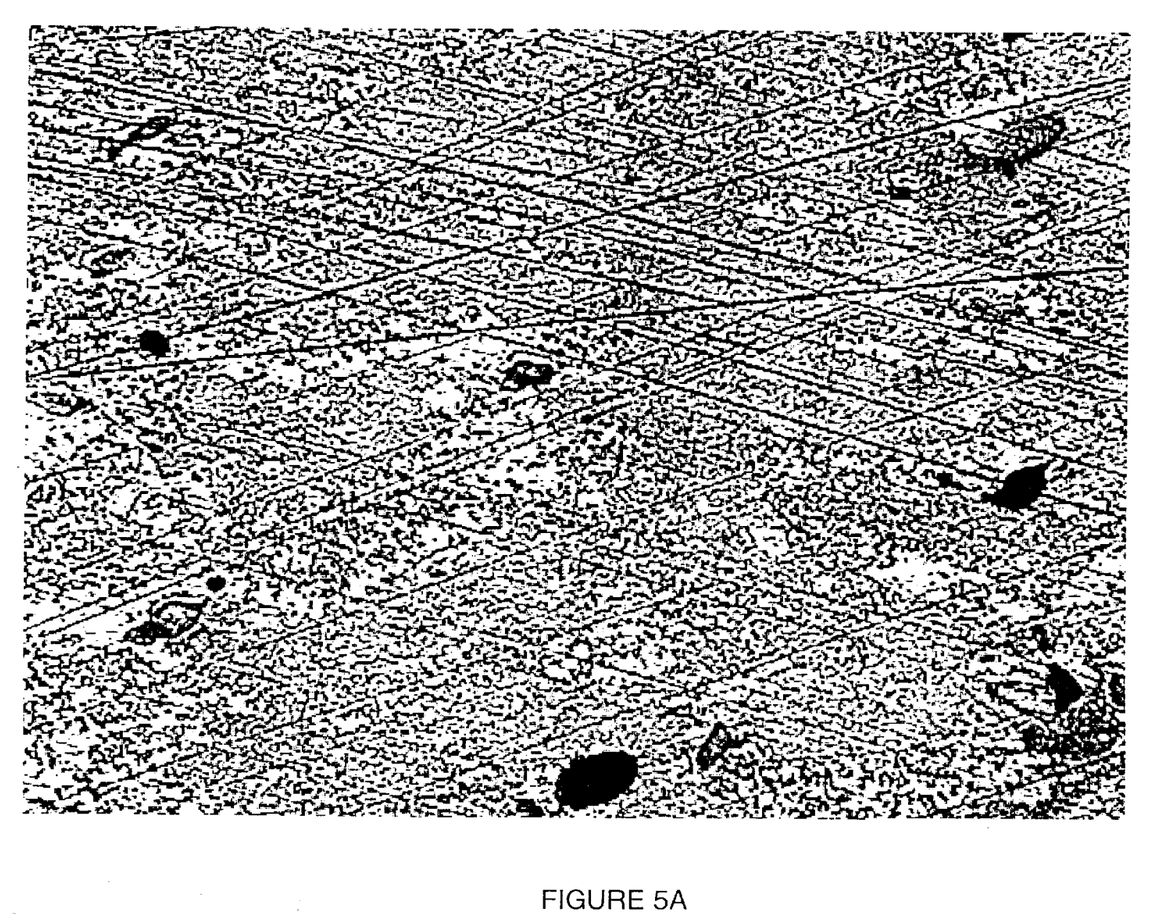
FIG. 5A shows the surface of an H13 tool steel sample deposited with a prior-art nozzle.
Figure 5B:
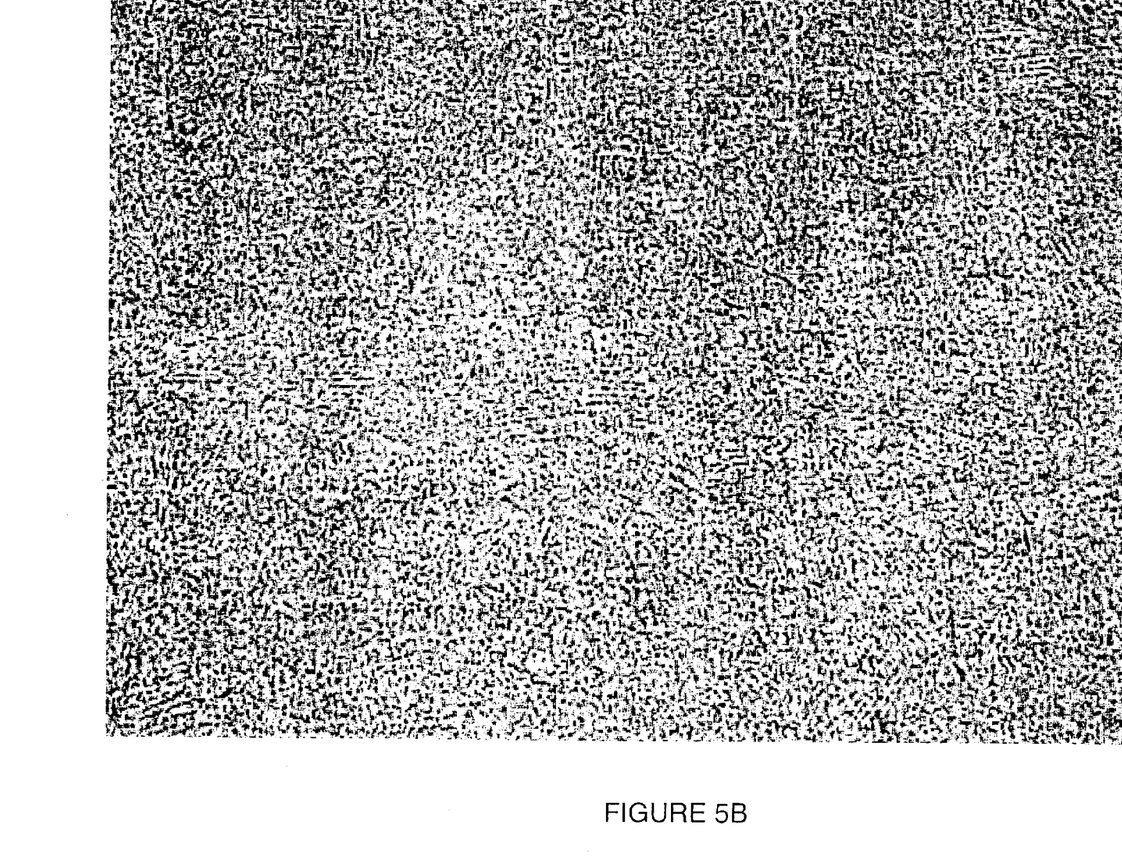
FIG. 5B shows the surface of an H13 tool steel sample deposited using the preferred nozzle described herein.
Figure 6A:
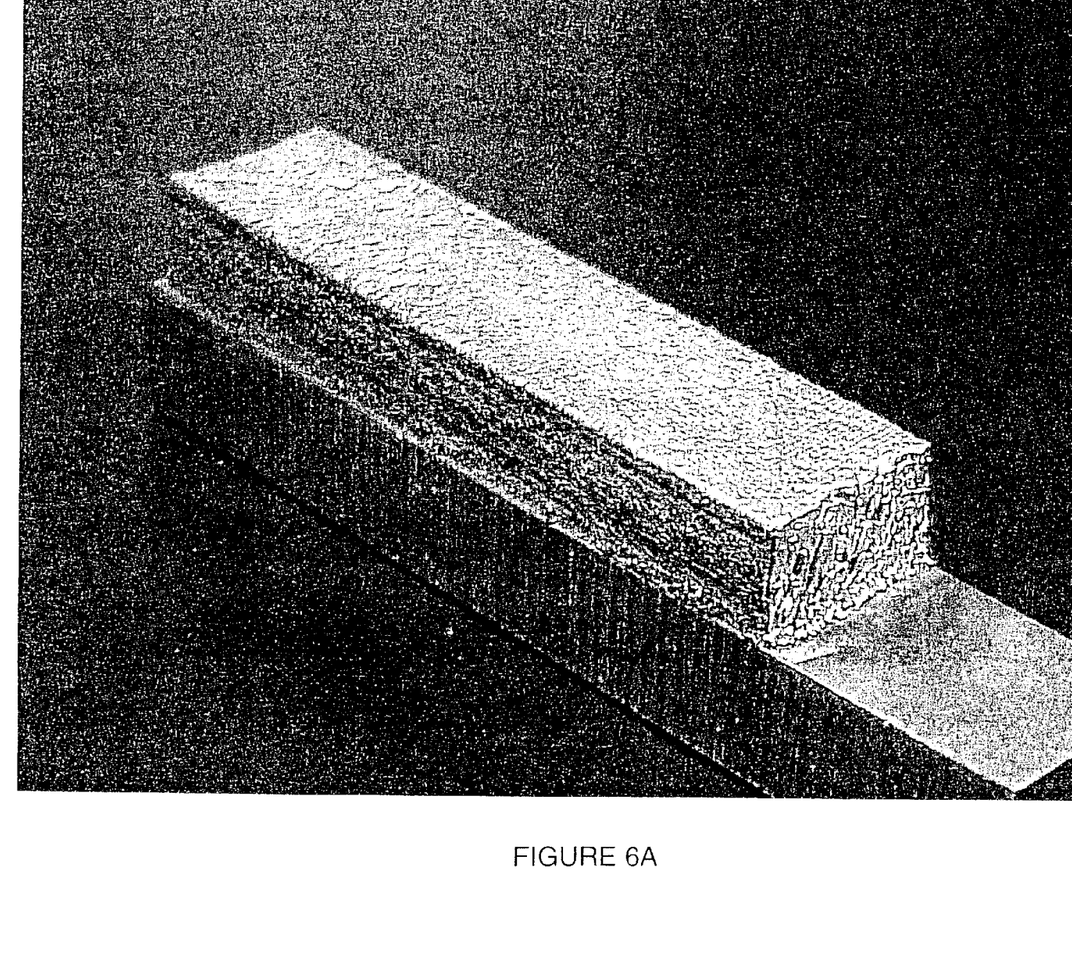
FIG. 6A is a photograph of a test specimen processed using a prior-art nozzle.
Figure 6B:
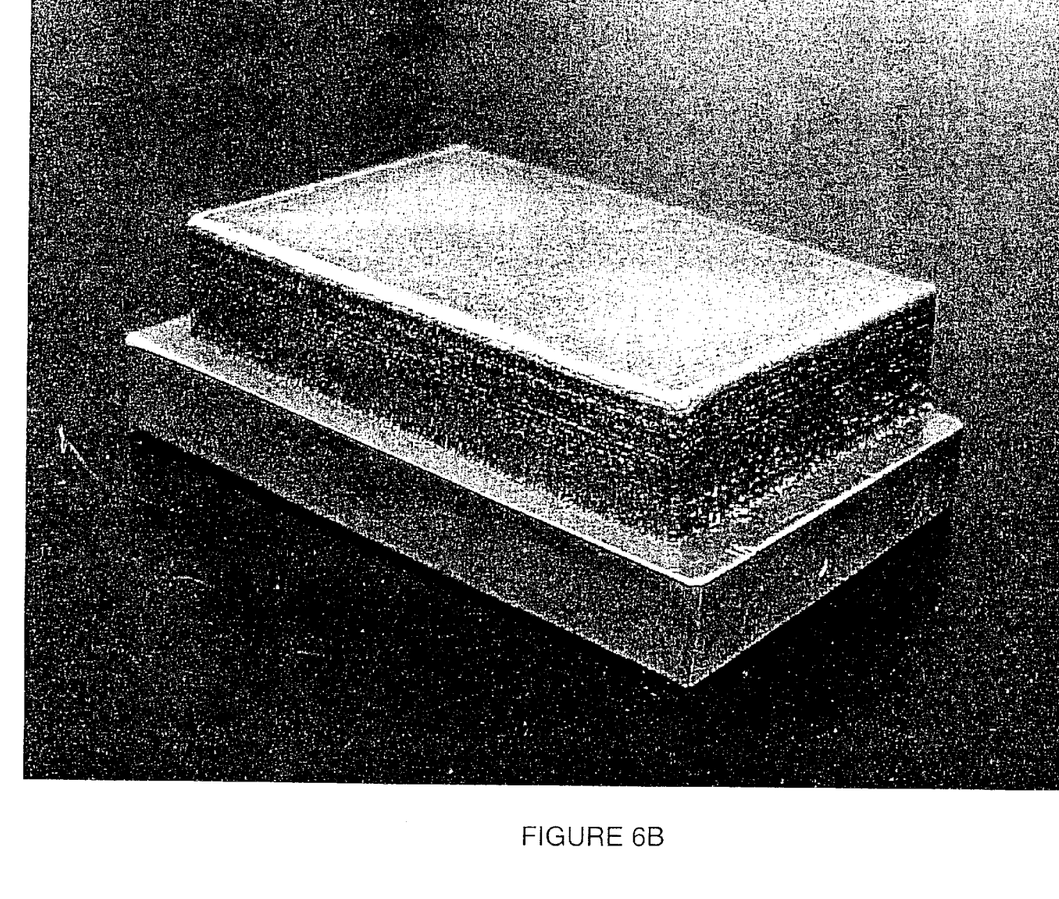
FIG. 6B is a photograph of a test specimen processed using the inventive nozzle.

FIG. 5A shows the surface of H13 tool steel deposited with a prior-art nozzle manufactured by Quantum Laser Corp. Magnification is 100× with a 5% nital etch. Note the high degree of porosity. FIG. 5B shows the surface of H13 tool steel deposited using the preferred embodiment described herein. Again, magnification is 100× with a 5% nital etch. Note the dense, fine martinsitic grain structure. FIG. 6A is a photograph of a test specimen processed using a prior-art nozzle. Note the rough surface quality. FIG. 6B is a photograph of a test specimen processed using the inventive nozzle. The material in both cases is H13 tool steel. The sample of FIG. 6B measures 60 by 60 mm.

The inventive nozzle also has much greater process efficiencies associated with powder utilization. As previously noted, other powder nozzles used in laser cladding or deposition processes have very low powder efficiencies. Typical powder utilization efficiencies of existing processes range between 11–15%. The efficiency is the percentage of the amount powder being deposited relative to the amount of powder which is being delivered to the melt pool by the nozzle. This means only 11–15% of the powder being delivered is used during deposition. The low efficiency causes excess powder on the surface of the workpiece, increased frequency of adding material to the storage device or powder feeder, increased amounts of material to be removed or reclaimed from the processing, or work, table. The following test criteria were performed to determine the improvements using the inventive nozzle in comparison with the Quantum Laser cladding nozzle.

Powder Efficiency Test:

This test was performed to calculate the powder efficiency of the process using the DMD™ Nozzle. The following process parameters were used to define the test:

| | |
|---|---|
| Material Type: | H13 Tool Steel |
| Material Density: | 7.8 g/cc [0.282 lb/in³] |
| Deposition Geometry: | 60 mm × 60 mm [2.36" × 2.36"] |
| Layer Thickness: | 0.38 mm [0.015"] |
| Deposition Bead Width: | 1.20 mm [0.047"] |
| Bead Overlap: | 0.40 mm [0.016"] or 0.80 mm stepover |
| CNC Velocity: | 600 mm/m [23.6 in/min] |
| Powder Feed Rate: | 3.15 g/m |
| Total Number of Layers | 30 |
| Test Data: Substrate Mass (Before Improvement): | 1080 grams [2.38 lb] |
| Actual Deposition Geometry: | 61.2 mm × 61.2 mm × 11.42 mm |
| Total Mass (Post-DMD ™): | 1410 grams [3.117 lb] |
| DMD ™ Mass: | 330 grams [0.736 lb] |
| DMD ™ Beam On Time: | 240 minutes |
| Total DMD ™ Volume: | 42.77 cc [2.61 in³] |

Material Deposition Rate=(DMD™ Mass)/(DMD™ Beam On Time)=(330 g/240 min)=1.375 g/m $$\text{Powder Efficiency} = (\text{Material Deposition Rate})/(\text{Powder Feed Rate}) = $$
$$(1.375 \text{ g/m})/(3.15 \text{ g/m}) = 43.7\%$$

As the above results indicate, the powder efficiency using the inventive nozzle is greatly improved. Using the inventive nozzle, the deposition rate was increased one and one half (1.5) times what was previously achieved using the prior art nozzle. The following is an overview comparing the inventive nozzle versus the Quantum Laser nozzle:

| | DMD ™ Nozzle | Quantum Laser Nozzle |
|---|---|---|
| Deposition Rate | 1.375 g/m [0.645 in³/hr] | 0.917 g/m [0.430 in³/hr] |
| Powder Efficiency | 43.7% | 11.0% |
| Powder Feed Rate | 3.15 g/m [0.416 lb/hr] | 5.5 g/m [0.728 lb/hr] |

The increase in efficiency is primarily due to the control of the shaping gas. The "shaping gas" tip is comprised of a plurality of evenly spaced ports around the diameter of the outer tip, preferably 16 in number. The port length, diameter, and angle are defined by a predetermined flow calculation. As the powder flows out of the nozzle the shaping gas, typically an inert gas such as argon, causes the powder to focus to a point based on the angle the laminar flow of gas is exiting the 16 ports. The powder intersects at the defined laser beam diameter. This results in a more concentrated and focused conical shape of powder.

The inventive nozzle also improves surface quality, again primarily due to the shaping gas concentrating and containing the powder locally to the laser beam diameter that is being utilized. The vertical and horizontal surfaces are more consistent and accurate that existing laser cladding or deposition nozzles. The following is a comparison of the inventive nozzle versus the Quantum Laser nozzle in terms of surface quality:

| | DMD ™ Nozzle | Quantum Laser Nozzle |
|---|---|---|
| Horizontal Surfaces | +0.003" to +0.005" | +0.006" to +0.009" |
| Vertical | +0.001" to +0.003" | +0.004" to +0.010" |
| Flatness | +0.002 | +0.007 |

Overall, the improved reliability and maintainability. The following items describe the functions which improve reliability, and allow for easy maintenance:

Interchangeable parts allows for multiple configurations.

Assembly is fully adjustable in the Z-axis (horizontal). Required for changing beam diameters and variable stand off from the workpiece Spanner wrenches are used to assemble/disassemble.

All powder feed, inert gas, and water lines are connected to the nozzle using quick disconnect compression fittings.

All powder feed, inert gas, and water lines are orientated to avoid any exposure to laser reflections from the melt pool.

Improved cooling to eliminate occurrences of clogging or overheating.

Hard Chromium plating on surfaces exposed to highly abrasive processing powders.

If damage occurs to the nozzle, the individual component can be replaced that is damaged versus the entire assembly.

I claim:

1. A nozzle assembly particularly suited to direct metal deposition, comprising:
    a body having a central axis and a distal end terminating in a distal tip, the distal tip including a conical end against which the powder is urged prior to exiting the body to assist in directing the powder to the localized point of the workpiece;
    a laser beam aligned with the central axis and emerging from the distal tip;
    a gas-carried powder feed path terminating in one or more powder outlets arranged in a first concentric ring surrounding the laser beam;
    a shaping-gas inlet and one or more shaping-gas outlets arranged in a second concentric ring surrounding the laser beam; and
    wherein the construction of the body is such that the laser beam, powder, and shaping gas all converge substantially within a localized region of a workpiece spaced apart from the distal tip at a working distance.

2. The nozzle assembly of claim 1, wherein:
    the body is constructed out of copper, a copper alloy, or other highly thermally conductive martial; and
    wherein the surfaces of the body exposed to powder flow are electroplated with hard chromium.

3. The nozzle assembly of claim 1, wherein the surfaces of the body exposed to powder flow are electroplated with hard chromium.

4. The nozzle assembly of claim 1, wherein the shaping gas exits the body in a laminar flow condition.

5. The nozzle assembly of claim 1, wherein at least a portion of the distal tip is adjustable to alter the working distance.

6. The nozzle assembly of claim 1, wherein the working distance is adjustable between 10 and 30 mm.

7. The nozzle assembly of claim 1, further including a coolant input and output and a cooling circuit within the body that promotes turbulent flow of the coolant.

8. The nozzle assembly of claim 1, further including one or more contact thermocouples associated with terminating the operation of the nozzle or generating an alarm if a preset temperature is reached.

9. The nozzle assembly of claim 1, wherein the body is constructed out of a highly thermally conductive material.

10. The nozzle assembly of claim 1, wherein the material is copper or an alloy thereof.

11. A nozzle assembly particularly suited to direct metal deposition, comprising:
    a body having a central axis and a distal end terminating in a distal tip;
    a laser beam aligned with the central axis and emerging from the distal tip;
    a coolant in put and output and a cooling circuit within the body that promotes turbulent flow of the coolant therewithin;
    one or more contact thermocouples associated with terminating the operation of the nozzle or generating an alarm if a preset temperature is reached;
    a gas-carried powder feed path terminating in one or more powder outlets arranged in a first concentric ring surrounding the laser beam;
    a shaping-gas inlet and one or more shaping-gas outlets arranged in a second concentric ring surrounding the laser beam;
    the construction of the body is such that the laser beam, powder, and shaping gas all converge substantially within a localized region of a workpiece spaced apart from the distal tip at a working distance; and
    wherein at least a portion of the distal tip is adjustable to alter the working distance.

12. The nozzle assembly of claim 11, wherein the shaping gas exits the body in a laminar flow condition.

13. he nozzle assembly of claim 11, wherein the working distance is adjustable between 10 and 30 mm.

14. A nozzle assembly particularly suited to direct metal deposition, comprising:
    a body having a central axis and a distal end terminating in a distal tip;
    a laser beam aligned with the central axis and emerging from the distal tip;
    a coolant input and output and a cooling circuit within the body that promotes turbulent flow of the coolant;
    a powder inlet and one or more powder outlets arranged in a first concentric ring surrounding the laser beam;
    a shaping-gas inlet and one or more shaping-gas outlets arranged in a second concentric ring surrounding the laser beam; and
    an inner tip surrounding the laser beam, the distal tip including conical end against which the pow der is urged prior to exiting the body, such that the laser beam, powder, and shaping gas all converge substantially within a localized region of a workpiece spaced apart from the distal tip at a working distance.

15. The nozzle assembly of claim 14, wherein the working distance is adjustable bet ween 10 and 30 mm.

16. The nozzle assembly of claim 14, further including one or more contact thermocouples in communication with a controller for terminating the operation of the nozzle or generating an alarm if a desired operating condition is not met.

17. The nozzle assembly of claim 14, wherein:
    the body is constructed out of copper, a copper alloy, or other highly thermally conductive material; and
    wherein the surfaces of the body exposed to powder flow are electroplated with hard chromium.

18. The nozzle assembly of claim 14, wherein the shaping gas exits the body in a laminar flow condition.

19. The nozzle assembly of claim 14, wherein at least a portion of the distal tip is adjustable to alter the working distance.

* * * * *

UNITED STATES PATENT AND TRADEMARK OFFICE
CERTIFICATE OF CORRECTION

PATENT NO. : 6,534,745 B1
DATED : March 18, 2003
INVENTOR(S) : Lowney

It is certified that error appears in the above-identified patent and that said Letters Patent is hereby corrected as shown below:

<u>Title page,</u>
Item [76], Inventor, replace "Mathew" with -- Matthew --.

<u>Column 8,</u>
Line 5, replace "in put" with -- input --.
Line 44, replace "pow der" with -- powder --.

Signed and Sealed this

Fifteenth Day of July, 2003

JAMES E. ROGAN
*Director of the United States Patent and Trademark Office*